(12) United States Patent
Di Balsamo et al.

(10) Patent No.: US 10,565,012 B2
(45) Date of Patent: *Feb. 18, 2020

(54) SYSTEM INTERVENTIONS BASED ON EXPECTED IMPACTS OF SYSTEM EVENTS ON SCHEDULE WORK UNITS

(71) Applicant: International Business Machines Corporation, Armonk, NY (US)

(72) Inventors: Arcangelo Di Balsamo, Aprilia (IT); Giuseppe Longobardi, Castellammare di Stabia (IT); Franco Mossotto, Rom (IT); Francesca Liliana Pasceri, Guidonia (IT); Alessandro Scotti, Rome (IT); Flora Tramontano Guerritore, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/504,516

(22) Filed: Jul. 8, 2019

(65) Prior Publication Data
US 2019/0332432 A1  Oct. 31, 2019

Related U.S. Application Data

(63) Continuation of application No. 15/493,381, filed on Apr. 21, 2017, now Pat. No. 10,417,044.

(51) Int. Cl.
  *G06F 9/44* (2018.01)
  *G06F 9/48* (2006.01)
  *G06F 9/54* (2006.01)

(52) U.S. Cl.
  CPC ............ *G06F 9/4887* (2013.01); *G06F 9/542* (2013.01)

(58) Field of Classification Search
  CPC ....................................................... G06F 9/44
  See application file for complete search history.

(56) References Cited

U.S. PATENT DOCUMENTS

| 7,509,518 B2 | 3/2009 | Bailey et al. |
| 7,580,906 B2 | 8/2009 | Faihe |
| (Continued) | | |

FOREIGN PATENT DOCUMENTS

WO   WO 2012005611   1/2012

OTHER PUBLICATIONS

Zirkel et al., Proactive Problem Management and Event Correlation, A best practice approach, Conference Paper Jan. 2011, 7 pages.
(Continued)

*Primary Examiner* — Jae U Jeon
(74) *Attorney, Agent, or Firm* — Schmeiser, Olsen & Watts, LLP; William Hartwell (57) ABSTRACT

Expected impacts of one or more impacting system events of one or more system events on execution of one or more impacted work units of one or more work units are estimated according to (i) system event historical information indicative of previous occurrences in a computing system of the one or more system events and (ii) work unit historical information indicative of previous executions of the one or more work units. Expected problems in a workload plan are predicted in response to any current occurrences of the impacting system events according to the corresponding expected impacts and the workload plan. An intervention program of one or more system interventions on the computing system is established. The system interventions address the current occurrences of the impacting system events according to the corresponding expected problems. An indication of the intervention program for programming the system interventions accordingly is outputted.

20 Claims, 6 Drawing Sheets

(56) References Cited

U.S. PATENT DOCUMENTS

| | | |
|---|---|---|
| 7,689,873 B1 | 3/2010 | Bennett |
| 7,962,472 B2 | 6/2011 | Erickson et al. |
| 8,266,622 B2 | 9/2012 | Cardelli |
| 8,713,578 B2 | 4/2014 | Cardelli et al. |
| 2003/0187967 A1* | 10/2003 | Walsh ................. H04L 41/0672 709/223 |
| 2004/0064551 A1* | 4/2004 | Amano .................. G08O 19/00 709/224 |
| 2004/0261070 A1* | 12/2004 | Miller ....................... G06F 8/71 717/170 |
| 2006/0072707 A1 | 4/2006 | Araujo et al. |
| 2016/0019388 A1 | 1/2016 | Singla et al. |
| 2018/0307481 A1* | 10/2018 | Ganesan .................. G06F 8/71 |
| 2018/0307532 A1 | 10/2018 | Di Balsamo et al. |

OTHER PUBLICATIONS

Notice of Allowance (dated May 6, 2019) for U.S. Appl. No. 15/493,381, filed Apr. 21, 2017.

* cited by examiner

SYSTEM INTERVENTIONS BASED ON EXPECTED IMPACTS OF SYSTEM EVENTS ON SCHEDULE WORK UNITS

This application is a Continuation application claiming priority to Ser. No. 15/493,381, filed Apr. 21, 2017.

TECHNICAL FIELD

The present disclosure relates to information technology field, and more specifically to workload schedulers.

BACKGROUND

Workload schedulers are commonly used in computing systems to control execution of large numbers of work units (i.e., any activities suitable to be executed thereon, such as batch jobs). For this purpose, each workload scheduler arranges the work units in a workload plan. The workload plan defines a flow of execution of the work units according to corresponding constraints (for example, the expected execution times of the work units and dependencies on other work units).

The workload plan is aimed at achieving one or more desired targets. For example, these targets comprise the completion of work units providing deliverable items (such as printed reports) within predefined workload deadlines. The meeting of the targets of the workload plan is important. Typical examples of when meeting the targets is important are when the execution of the work units is required for other system/business activities, or when a Service Level Objective (SLO) has been negotiated between a service provider implementing the execution of the work units and customers thereof (wherein the service provider has committed to provide a corresponding service with a specific level of performance, especially in terms of reliability and responsiveness). Therefore, any problems in the execution of the work units that cause the missing of some targets of the workload plan may have quite serious consequences (for example, system/business outages, payment of penalties).

Critical path methods (CPMs) are available to facilitate the management of the workload plan. Generally, these critical path methods identify critical paths in the workload plan as defined by the work units belonging to the longest paths to the workload plan's targets (according to expected durations of the work units estimated from their previous executions). This information pertaining to the ethical paths allows determining the impacts of any problems that may be experienced in the execution of the work units (for example, a failure or a delay) on the whole workload plan.

The problems in the execution of the work units may be caused by a number of reasons (for example, errors, unavailable resources, either temporary or permanent). Whenever such problems occur, diagnostics activities are performed in an attempt to identify the cause of each problem and to either fix the problem or bypass the problem. These diagnostic activities are quite time consuming by generally requiring deep investigations mainly based on manual activities. However, human resources that are available for performing the diagnostic activities are generally limited and costly (due to breadth and depth of skills required). Therefore, the solution of the problems timely (especially, before missing the targets of the workload plan) is quite challenging. Particularly, when multiple problems occur at the same time, it is very difficult to allocate the available human resources at best for limiting impacts of the problems on the workload plan.

In different contexts, several techniques have been proposed for managing errors. For example, a technique may be used for determining the impact of a failure of a component on one or more services that be component is supporting (according to real time data feeds that are received from processing nodes running the components and a corresponding mapping). A technique may be used for prioritizing error notification based on a cost of each error type (depending on importance of correcting the error type, level of agreement between those who fix the errors and those who determine the importance of correction of the errors and an estimate of other error types caused by the errors). A technique may be used for determining impact of faults on network services (based on discovering devices in the network that are respectively connected to any specified device, to assist in performing an intended task, and then discovering each service that is configured to run on each of the devices).

SUMMARY

Embodiments of the preset invention provide a method, and an associated system and computer program product. One or more processors retrieve system event historical information indicative of previous occurrences in a computing system of one or more system events. The one or more processors retrieve work unit historical information indicative of previous executions of one or more work units. The one or more processors estimate one or more expected impacts of one or more impacting system events of the system events on the execution of one or more impacted work units of the one or more work units according to the system event historical information and the work unit historical information. The one or more processors predict one or more expected problems in a workload plan in response to any current occurrences of the impacting system events according to the corresponding expected impacts and the workload plan. The one or more processors establish an intervention program of one or more system interventions on the computing system, the system interventions addressing the current occurrences of the impacting system events according to the corresponding expected problems. The one or more processors output an indication of the intervention program for programming the system interventions accordingly.

DETAILED DESCRIPTION

FIGS. 1A-1D show general principles of implementing embodiments of the present invention.

Figure 1A:
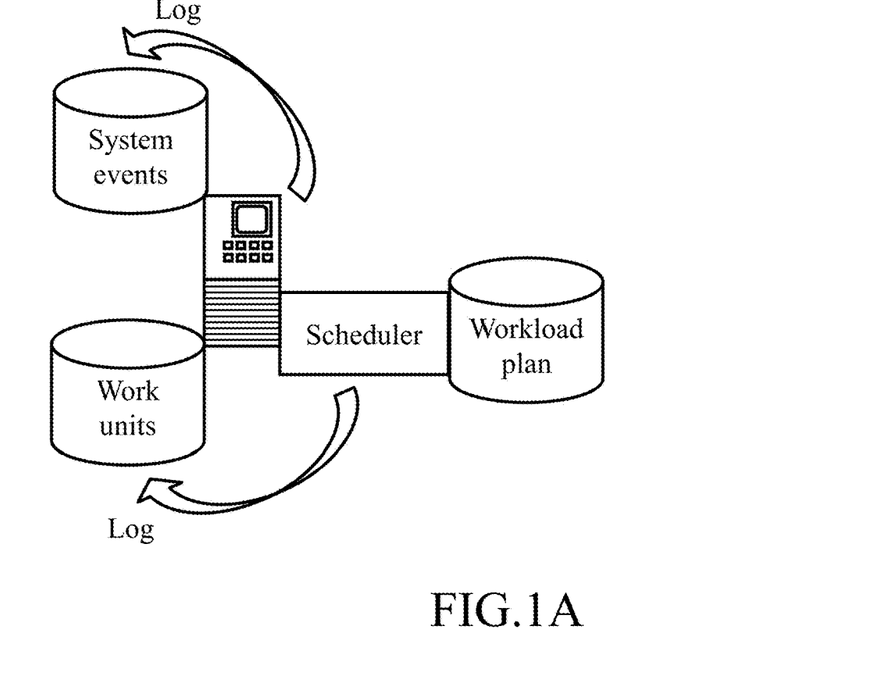
FIGS. 1A-1D show general principles of implementing embodiments of the present invention.

In FIG. 1A, a workload scheduler runs on a computing system (for example, a control server of a server farm). The workload scheduler controls execution in the computing system (for example, execution servers of the same server farm) of one or more work units (for example, batch jobs) according to a workload plan. During operation of the computing system, system, event historical information is logged (for example, by a monitoring application). The system event historical information is indicative of previous occurrences in the computing system of system events (for example, errors, warnings in the execution servers). At the same time, work unit historical information is logged (for example, by the workload scheduler). The work unit historical information is indicative of previous executions of the work units (for example, durations of the work units, results of the work units).

Figure 1B:
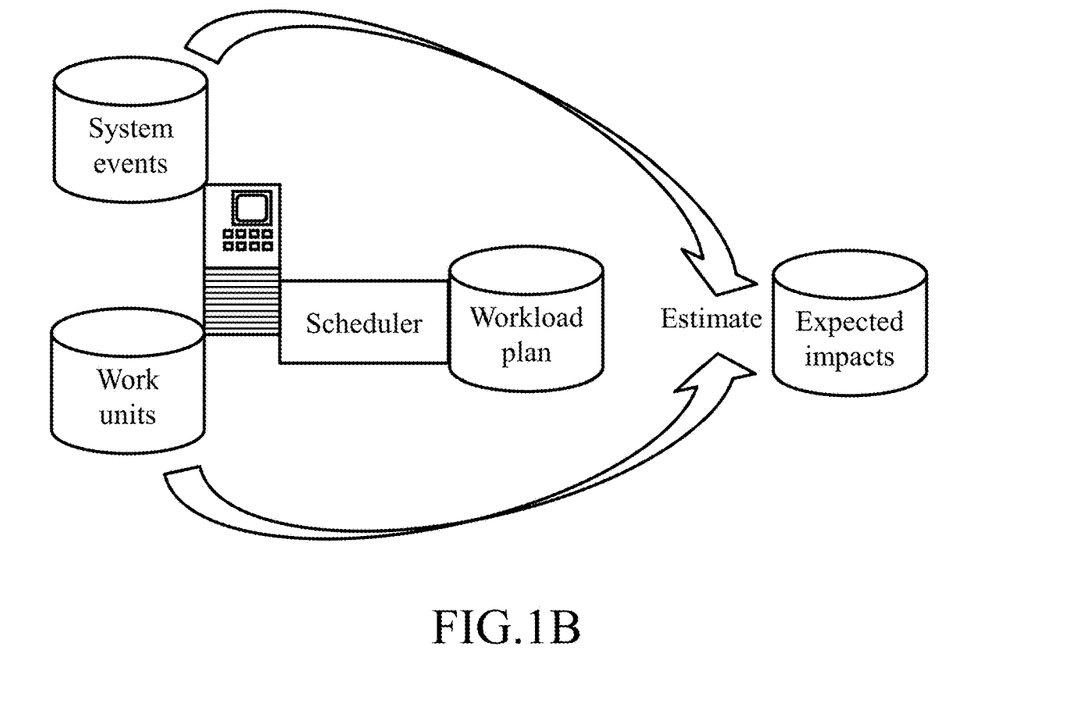

In FIG. 1B, the (previously logged) system event historical information and work unit historical information are retrieved. One or more expected impacts are estimated of at least part of the system events (impacting system events) on the execution of at least part of the work units (impacted work units). The expected impacts are estimated according to (for example, by correlating) the system event historical information and the work unit historical information. For example, each expected impact indicates a failure and/or a delay in the execution of one or more work units that are likely to be caused by the occurrence of a system event. Particularly, in a very simple scenario, a system event SE1 is expected to cause the failure of a work unit WU1, a system event SE2 is expected to cause the failure of two work units WU2a, Wu2b, a system event SE3 is expected to cause the failure of a work unit Wu3, and a system event SE4 is expected to cause the failure of three work units WU4a, WU4b, WU4c.

Figure 1C:
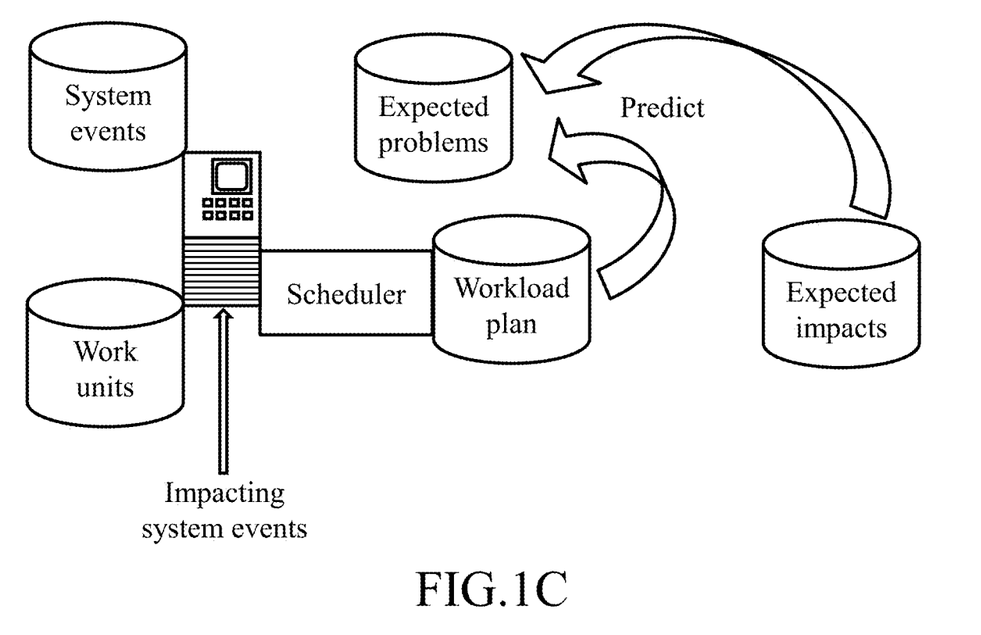

In FIG. 1C, one or more expected problems in the workload plan are predicted in response to one or more current occurrences of the impacting system events. The excepted problems are predicted according to the corresponding expected impacts and the workload plan. For example, each expected problem indicates a (workload) deadline of the workload plan that is likely to be missed in response to an impacting system event, because of the failure/delay of an impacted work unit. Moreover, the expected problem may indicate an intervention time that is available to address the system event before the expected problem manifests. Particularly, in the same scenario of above, the system event SE1 is expected to cause missing a workload deadline WD1a after 4 h and a workload deadline WD1b after 6 h, the system event SE2 is expected to cause missing a workload deadline WD2 after 1 h, the system event SE3 is expected to cause missing a workload deadline WD3 after 2 h, and the system event SE4 is expected to cause missing a workload deadline WPD4a after 6 h and a workload deadline WD4b after 7 h.

Figure 1D:
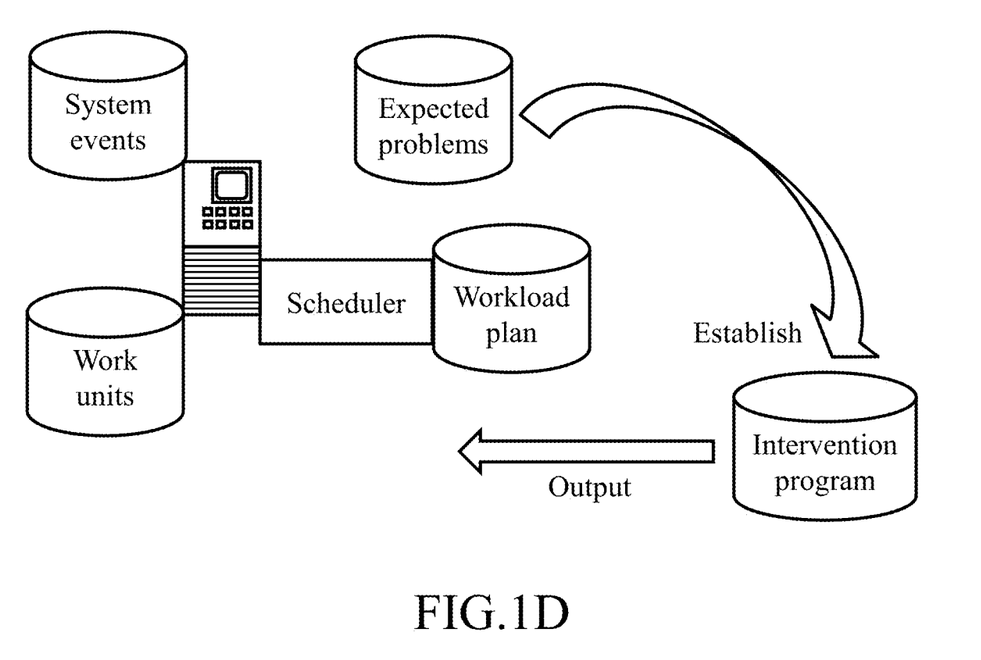

In FIG. 1D, an intervention program is established. The intervention program indicates system interventions on the computing system that are required to address the current occurrences of the impacting system events (for example, for solving errors, for provisioning missing resources). The system interventions are planned according to the corresponding expected problems that have been predicted. For example, the system interventions may be prioritized according to the intervention times of the corresponding impacting system events (in increasing order). Particularly, in the same scenario of above, the system interventions are ordered for addressing the system events SE2, SE3, SE1 and SE4 (which should be solved in 1 h, 2 h, 4 h and 6 h, respectively, to avoid missing the workload deadlines WD2, WD3, WD1a and WD4a, respectively). An indication of the intervention program is output (for example, by displaying the output on the control server). The intervention program is then used to program the system interventions accordingly (for example, by a system administrator). Particularly, in the same scenario of above, the system administrator may decide to allocate available human resources: at the beginning, all to the system event SE2; after the system event SE2 has been solved, most to the system event SE3 and the remaining to the system event SE1; and after the system event SE3 has been solved, half to the system event SE1 and half to the system event SE4.

The preceding scenario allows estimating the impacts (on the work units), and then the problems (in the workload plan), from system events occurring in a whole execution environment thereof. For example, an error in a hard-disk of an computing machine may cause the failure of one or more work units running on other computing machines if the one or more work units have to access this hard-disk remotely. Therefore, it is possible to discover impacts that are "hidden"; i.e., the impacts are not explicit (such as because relating to different computing machines in the above-mentioned example), without any introspection of the work units (and then being completely agnostic about implementations of the work units).

The above-described solution provides a proactive approach to the management of the computing system that is used by the workload scheduler (to execute the work units). Indeed, in this way it is possible to address the system events that may cause problems in the workload plan timely, since the impact of the system events on the execution of the work units is known in advance. For example, the knowledge of the time that is available to address the system events before the corresponding problems manifest in the workload plan and/or of the severity of the problems that may be caused by the system events in the workload plan allows prioritizing the corresponding system interventions accordingly (by allocating the available human resources at best). As a possible scenario, an error in a hard-disk of a single computing machine may be addressed before an error in a network router (even if the error in the hard-disk affects dozens of computing machines), for example, because the error in the hard-disk may cause a problem in the workload plan shortly or in a critical work unit.

In this way, it is possible to limit the impact of the system events on the workload plan. Particularly, in most practical situations it is possible to address the system events before the corresponding problems actually manifest, which simplifies the solution of any problems experienced in the workload plan, since the intervention program already indicates the probable causes of the problems which avoids (or at least significantly reduces) any investigation activity, thereby streamlining and making less dependent on personal skills the task of solving the problems.

The above-mentioned results are achieved by comparing historical information (relating to the previous occurrences of the system events and the previous executions of the work units). Therefore, any impacts of any system events on the execution of the work units may be discovered (without the need of knowing the impacts a priori) which moves away from the standard operation of the workload scheduler which is normally based only on a direct relation wherein the impacts on the workload plan are determined only according to the execution of the work units. Indeed, now the information that is internal to the workload scheduler (i.e., the work unit historical information and the workload plan) is combined with information (i.e., the system event historical information) that is external to the workload scheduler and then unrelated from the control of the execution of the work units.

The above described solution improves operation of the workload scheduler, which significantly reduces the risk of missing the targets of each workload plan and then the risk of the corresponding consequences, with corresponding positive effects on system/business productivity, customer satisfaction, compliance with SLOs.

Figure 2:
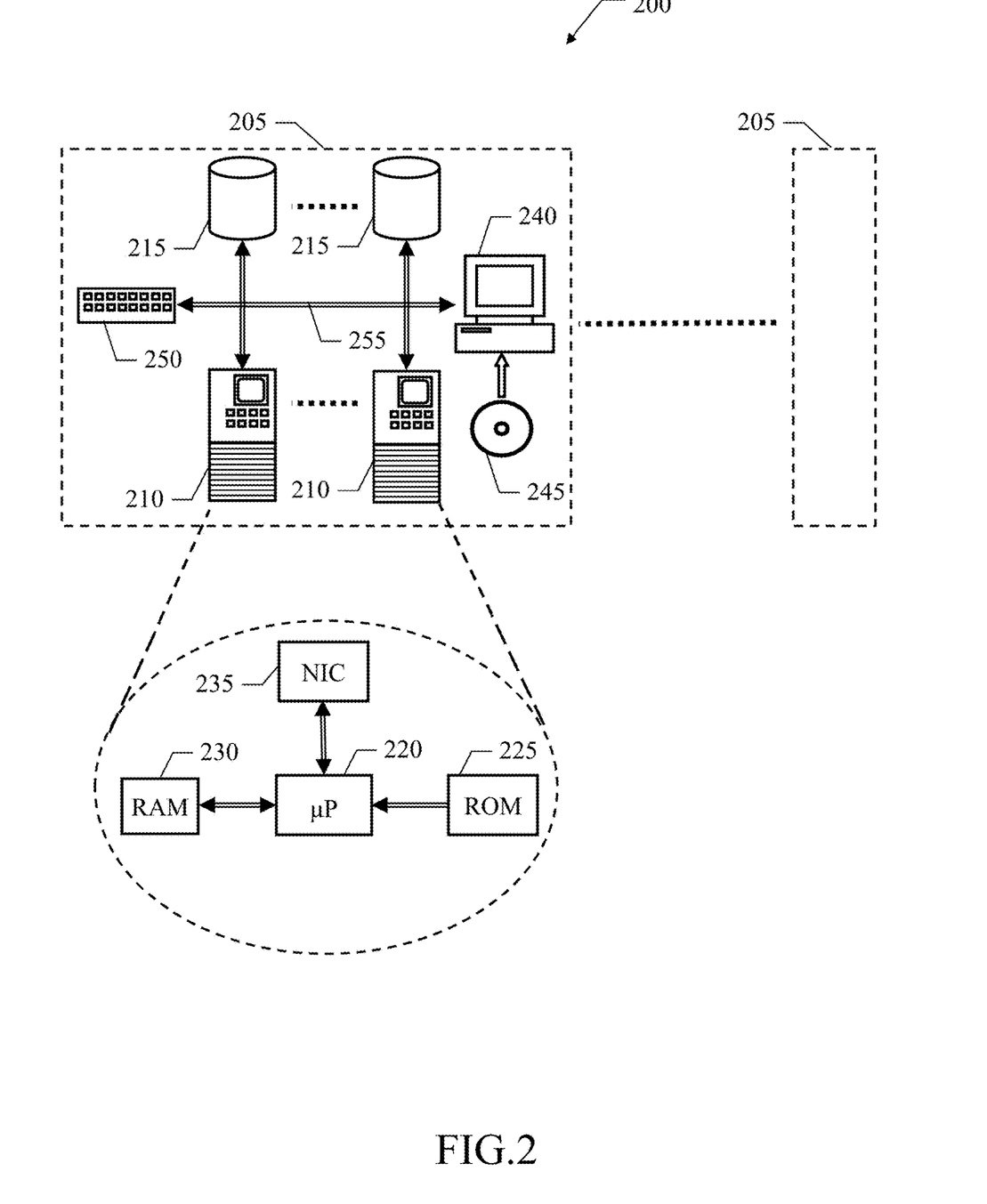
FIG. 2 shows a schematic block diagram of a computing system configured to implement embodiments of the present invention.

FIG. 2 shows a schematic block diagram of a computing system 200 configured to implement embodiments of the present invention.

The computing system 200 is implemented in one or more server farms 205. Each server farm 205 may comprise several server computing units 210 (for example, of the rack or blade type) and storage disks 215 (for example, of the RAID type) implementing mass-memories thereof. In turn, each computing unit 210 comprises one or more microprocessors (μP) 220 controlling its operation of the one or more microprocessors 220, a non-volatile memory (ROM) 225 storing basic code for a bootstrap thereof, a volatile memory (RAM) 230 used as a working memory by the microprocessors 220 and a network adapter (NIC) 235 used to plug the computing unit 210 in the server farm 205. The server farm 205 also comprises a console 240 for controlling the server farm 205 (for example, a personal computer, also provided with a drive for reading/writing removable storage units 245, such as optical disks like DVDs). A switch/router sub-system 250 manages any communications among the computing units 210, the disks 215 and the console 240, and with a communication network, for example, the Internet (not shown in FIG. 2). The computing units 210, the disks 215 and the console 240 are connected to the switch/router sub-system 250 through a cabling sub-system 255.

The server farms 205 implement a plurality of (physical or virtual) server computing machines or servers (communicating among the computing machines or servers). In one embodiment, one server of the one or more servers, referred to as a control server, runs the workload scheduler. The workload scheduler controls the execution of the work units on (one or more) other servers, referred to as execution servers.

Figure 3:
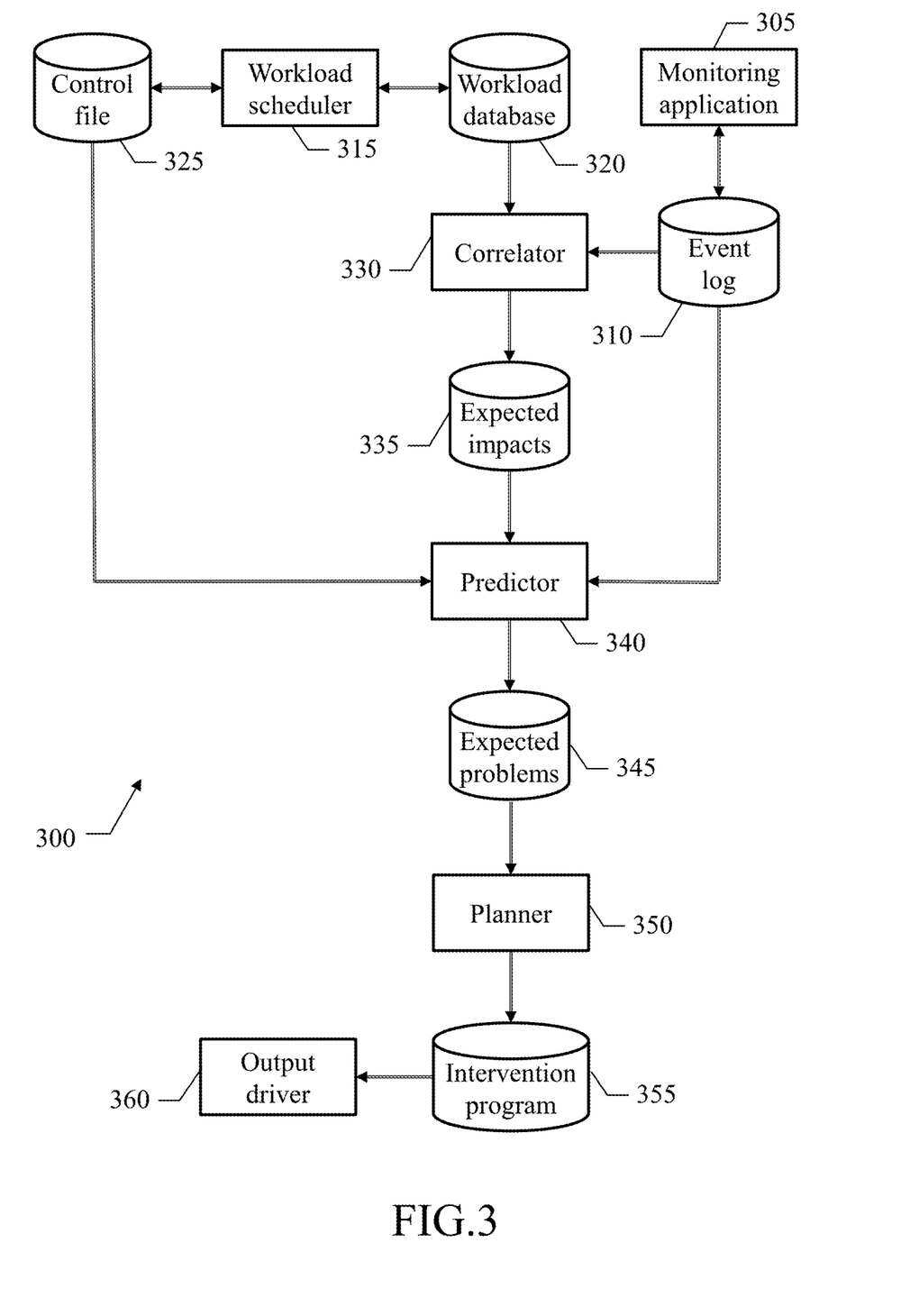
FIG. 3 shows software components that may be used to implement embodiments of the present invention.

FIG. 3 shows software components that may be used to implement embodiments of the present invention.

All the software components (programs and data) are denoted as a whole with the reference 300. The software components are typically stored in the mass memory and loaded (at least partially) into the working memory of the control server when the programs are running, together with an operating system and other application programs (not shown in FIG. 3). The programs are initially installed in the mass memory, for example, from removable storage units or from the communication network. In this respect, each program may be a module, segment or portion of code, which comprises one or more executable instructions for implementing the specified logical function.

Particularly, the control server comprises the following components. A monitoring application 305 is used to monitor operation of the execution servers (for example, by leveraging monitoring agents installed the execution servers, not shown in FIG. 3, which in turn collects information provided by corresponding operating systems). The monitoring application 305 accesses (in read/write mode) a system event log 310, which stores the system event historical information that has been collected from the execution servers over time. Particularly, the system event historical information comprises an indication of each previous occurrence of any hardware and/or software system event that has been logged on any execution server (for example, an identifier of the system event, an identifier of the execution server and a corresponding timestamp). The system event may relate to an error (for example, a shut-down of the execution server, a crash of any software program running thereon) or to a warning (for example, the reaching of a threshold by a resource of the execution server, such as the execution server's processing power usage, available working/mass memory, the reaching of a threshold by a workload of the execution server or of a software program running on the execution server, such as a number of active processes/threads, opened databases). Moreover, the system event may indicate the solution of a previous error (for example, the previous error's fix) or warning (for example, the returning within the corresponding threshold).

The workload scheduler (for example, the IBM Tivoli Workload Scheduler (TWS) by IBM® Corporations) is denoted with the reference 315. The workload scheduler 315 is used to control the execution of batches of work units on the execution servers (for example, by leveraging execution agents installed on the execution servers). The workload scheduler 315 accesses (in read/write mode) a workload database 320, which stores service information for controlling the execution of the work units. Particularly, the workload database 320 contains a definition of each execution server (for example, each execution server's identifier, physical/logical characteristics). Moreover, the workload database 320 contains a descriptor of each work unit (for example, a non-interactive job). Particularly, the descriptor indicates a software program to be invoked, a corresponding execution server (defined statically or dynamically), an execution time of the work unit (such as start tune and run-cycle), any constraints for its execution (such as preconditions, dependencies on the completion of other work units) and a possible workload deadline for its completion. The workload database 320 contains a work unit log, which stores the work unit historical information that has been collected during the previous executions of the work units. Particularly, for each work unit the work unit historical information comprises the results of each execution server's previous executions (i.e., completed or failed) and the actual durations of its completed previous executions. The workload database 320 contains statistical information of the work units. Particularly, for each work unit the statistical information indicates an expected duration of the work unit (for example, estimated from the previous durations of the work unit). The workload scheduler 315 further accesses (in read/write mode) a control file 325, which stores the workload plan. The workload plan specifies the flow of execution of the work units in a production period (for example, one day), together with the definition of the corresponding execution servers. The work units are arranged in the workload plan according to the constraints imposed on the work units.

In the solution according to an embodiment of the present invention, a correlator 330 is used to correlate the system event historical information and the work unit historical information. For this purpose, the correlator 330 accesses (in read mode) the system event log 310 and the work unit log in the workload database 320. The correlator 330 further accesses (in write de) an expected impact repository 335, which stores an indication of the expected impacts (of the impacting system events on the impacted work units) that have been estimated from this correlation. Particularly, the expected impacts are any situations that adversely affect execution of corresponding impacted work units, with respect to the standard behavior of the impacted work units (for example, causing a failure or a significant delay, such as by at least 20-30% of the expected durations of the work units). For each expected impact, the expected impact repository 355 indicates the impacting system event (i.e., the identifiers of the system event and of the execution server), the impacted work unit (i.e., an identifier of the impacted work unit), the expected impact (i.e., failure, delay with the amount of the failure, delay) and a corresponding confidence index. The confidence index quantifies the confidence that the expected impact manifests (in the impacted work unit) when the impacting system event occurs (for example, in terms of the probability of the expected impact).

A predictor 340 is used to estimate the expected problems (in response to current occurrences of the impacting system events). For this purpose, the predictor 340 accesses (in read mode) the system event log 310, the control file 325 and the expected impact repository 335. The predictor 340 further accesses (in write mode) an expected problem table 345, which stores an indication of the expected problems that have been predicted (and the impacting system events that are still to be solved). Particularly, each expected problem corresponds to a workload deadline of the workload plan that is likely to be missed because of a corresponding expected impact. For each expected problem, the expected problem table 345 indicates the corresponding impacting system event (i.e., the identifiers of the system event and of the execution server), the expected problem (i.e., the identifier of the impacted work unit, the expected impact and an identifier of the corresponding workload deadline), the confidence index of the expected impact, a corresponding severity index and a corresponding intervention time. The severity index quantifies a severity of the expected problem (for example, low when the workload deadline is not final, medium when the workload deadline causes tangible inconveniences and high when the workload deadline causes loss of business). The intervention time indicates a (maximum) time that is likely to elapse before the expected problem manifests (after the occurrence of the impacting system event), and then it is available to address the impacting system event (to solve the expected problem and then to avoid the actual manifestation of the expected problem).

A planner 350 is used to establish an intervention program for addressing the impacting system events. For this purpose, the planner 350 accesses (in read mode) the expected problem table 345. The planner 350 further accesses write mode) an intervention program file 355, which stores an indication of the intervention program. For each system intervention to be performed on the execution servers for addressing a corresponding impacting system event that is still to be solved, the intervention program indicates the impacting system event (i.e., the identifiers of the system event and of the execution server) and points to the corresponding expected problem (in the expected problem repository 345). The system interventions are prioritized according to the corresponding expected problems (for example, in increasing order of the intervention times of the system interventions). An output driver 360 (for example, for a monitor of the control server) is used to output the intervention program (for example, by displaying the intervention program). For this purpose, the output driver 360 accesses (in read mode) the intervention program file 355.

Figure 4A:
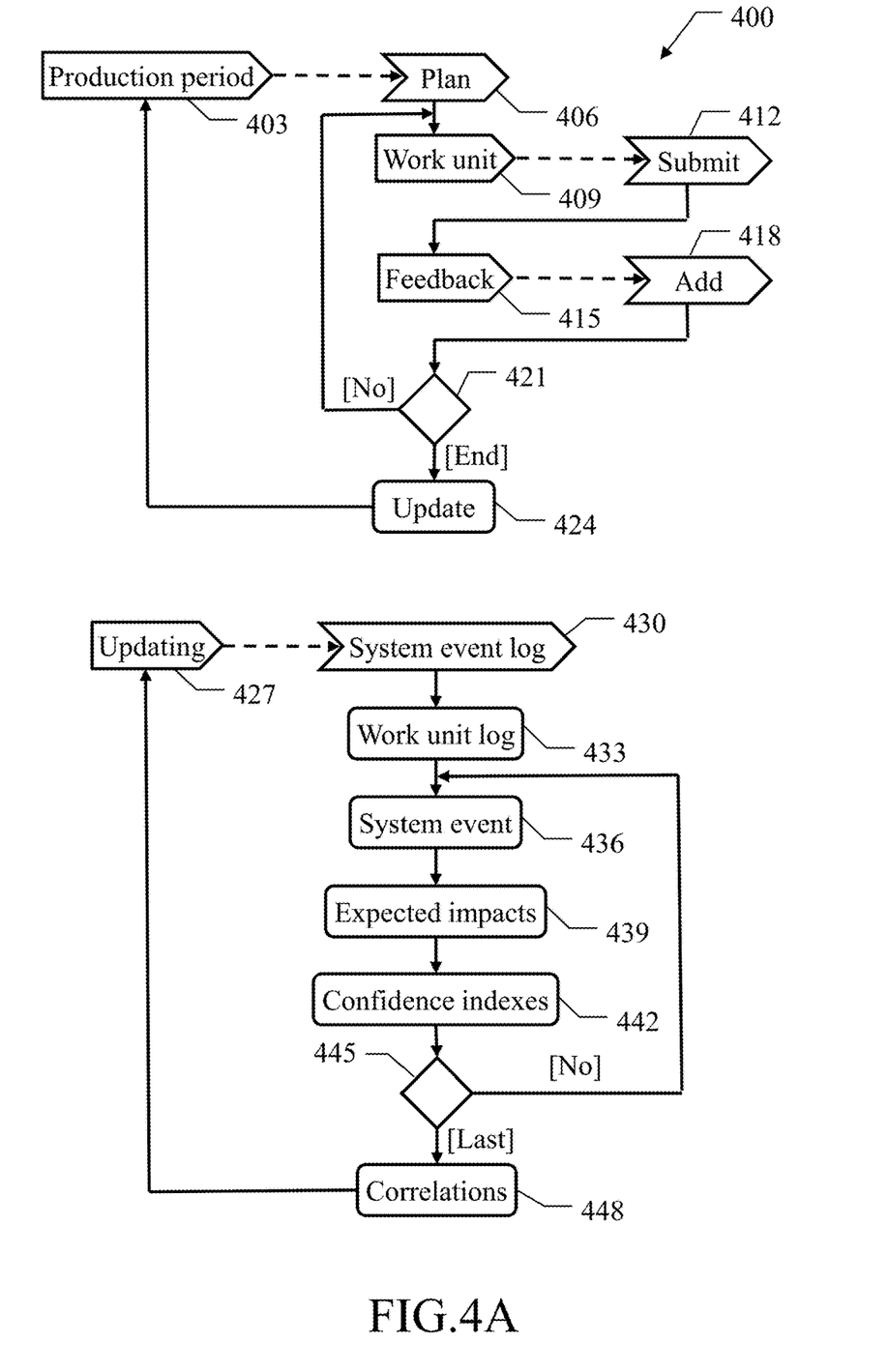
FIGS. 4A-4B show an activity diagram describing implementation of embodiments of the present invention.
Figure 4B:
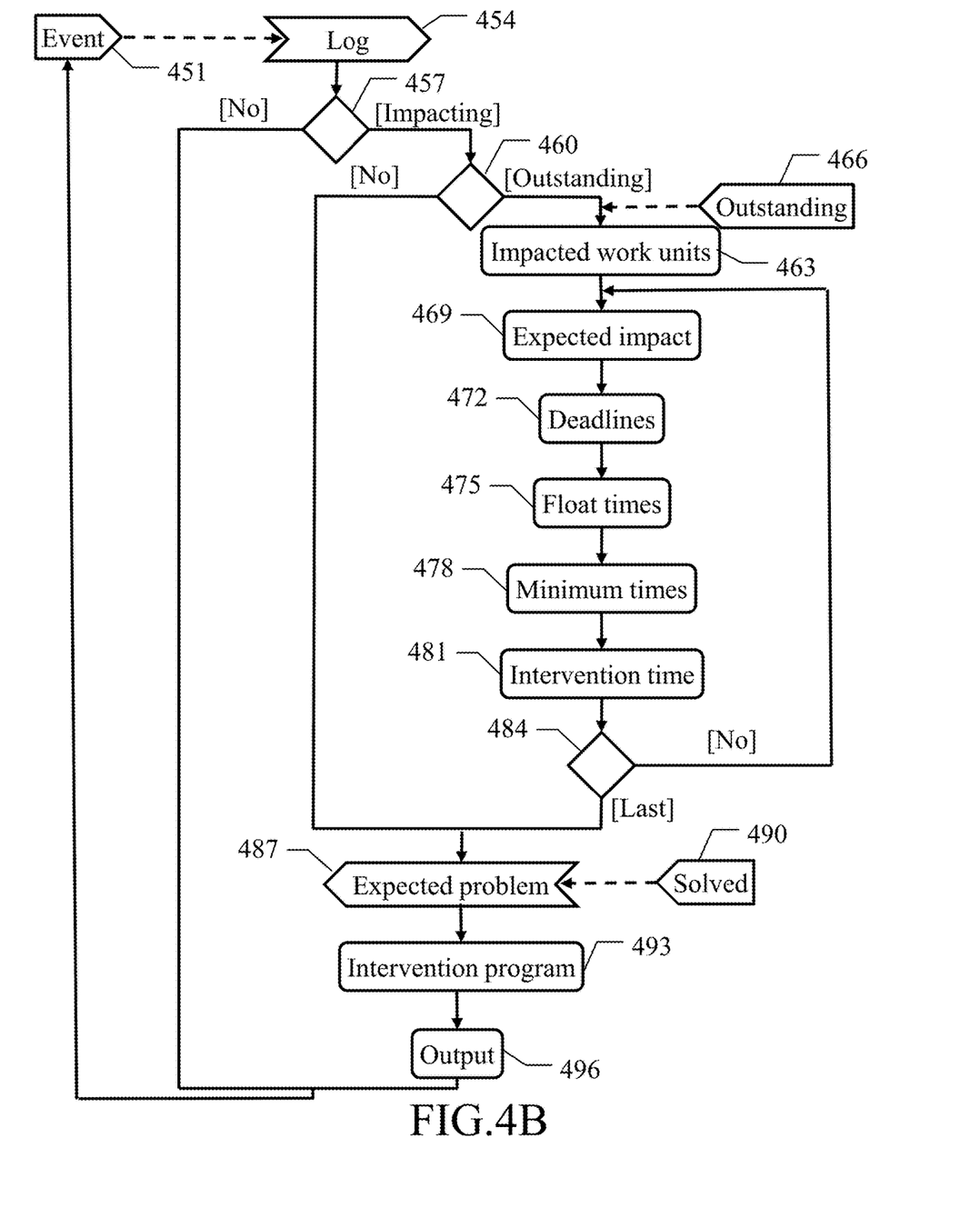

FIGS. 4A-4B show an activity diagram describing activities relating to an implementation of embodiments of the present invention.

Particularly, the activity diagram represents an exemplary process that may be used to manage the execution servers with a method 400. In this respect, each block in the system diagram may correspond to one or more executable instructions for implementing the specified logical function on the computer.

The process passes from block 403 to block 406 at the beginning of every production period. In response thereto, the workload scheduler extracts the workload plan from the control file and starts the workload plan. Continuing to block 409, the flow of activity passes to block 412 as soon as each (pending) work unit may be executed according to each work unit's constraints. In response thereto, the scheduler submits the work unit for execution (to the execution agent of the corresponding execution server). Continuing to block 415, the flow of activity passes to block 418 as soon as the scheduler receives feedback information relating to the (ended) execution of any work unit (from the execution agent of the corresponding execution server). The feedback information comprises an indication of the result of the execution of the work unit (i.e., completed or failed) and the actual duration of the work unit (if completed). In response thereto, the scheduler adds the feedback information to the control file (so as to provide a real-time picture of the progress of the workload plan). The scheduler verifies at block 421 whether the workload plan has ended (with the execution of all its work units). If not, the flow of activity returns to the block 409 to repeat the same operations continually. Conversely, once the workload plan has ended, the scheduler at block 424 updates the work unit log in the workload database according to the feedback information in the control file. Moreover, the scheduler updates the statistical information in the workload database accordingly. Particularly, the scheduler updates the expected duration of each work unit according to each work unit's actual duration (if completed), for example, equal to a corresponding running average. The scheduler then generates a new version of the workload plan for the next production period (by removing the work units of the previous production period that have been completed and adding the work units to be executed in the next production period, according to the work units' execution times and dependencies in view of the expected durations of the work units). The flow of activity then returns to the block 403 waiting for a next production period.

At the same time, the process passes from block 427 to block 430 as soon as an event triggering the updating of the expected impact repository occurs (for example, after every production period). At this point, the correlator retrieves the system event historical information from the system event log. Moreover, the correlator at block 433 retrieves the work unit historical information from the work unit log in the workload database. A loop is then entered for processing this information. The loop begins at block 436, wherein the correlator takes a (current) system vent of the system vent historical information into account (in any arbitrary order). Continuing to block 439, the correlator parses the work unit historical information. For each expected impact (as defined by a situation in the work unit historical information adversely affecting execution of the work units) the correlator determines a total counter of occurrences of each expected impact (calculated once for all the system events) and a match counter of its occurrences in conjunction with the system event (i.e., between each occurrence of each expected impact and the possible solution of each expected impact, as indicated in the system event historical information). Continuing to block 442, the correlator calculates the confidence index of each (potential) correlation between the system event and each of the expected impacts (for example, as the ratio between the match counter of the expected impacts and total counter in percentage). The correlator at block 445 then verifies whether a last system event has been processed. If not, the flow of activity returns to the block 436 to repeat the same operations for a next system event. Conversely, once all the system events have been processed the loop is exited by descending into block 448. At this point, the correlator accepts the correlations having the confidence indexes of the correlations that are (possibly strictly) higher than a confidence threshold (for example, 40-60%), whereas the other confidence indexes are discarded. Each accepted correlation then determines that its expected impact is likely to affect the corresponding (impacted) work unit when its (impacting) system event occurs (with a probability equal to the confidence index of each accepted correlation). The flow of activity then returns to the block 427 waiting for a next event triggering the updating of the expected impact repository.

In a completely independent way, the process passes from block 451 to block 454 as soon as a (new) system event occurs. In response thereto, the monitor application updates the system event log accordingly. The process continues to block 457 as soon as the predictor becomes aware of the system event (for example, by verifying the system event log periodically, such as every 1-5 s). At this point, the predictor verifies whether this system event is an impacting system event likely to impact one or more impacted work units (as indicated in the expected impact repository). If so, the predictor at block 460 verifies whether at least one of the impacted work units of the expected impacts is still pending (i.e., the impacted work is in execution or is waiting to be executed), as indicated in the control file.

If so (meaning that the impacting system event is likely to affect the workload plan), the flow of activity descends into block 463 to process the impacting system event. The same point is also reached from block 466, after every generation of a new version of the workload plan, for processing any (outstanding) impacting system event that is still to be solved (as indicated in the intervention program). At this point, the pending impacted work units of the impacting system event are taken into account (whereas any other impacted work units thereof are discarded). A loop is then entered for processing the corresponding expected impacts. The loop begins at block 469, wherein the predictor takes a (current) one of these expected impacts into account (in any arbitrary order). Continuing to block 472, the predictor determines all the workload deadlines relating to the corresponding (pending) impacted work unit (as indicated in the workload plan). These workload deadlines are the workload deadlines that follow the impacted work unit directly (i.e., without any other interposed workload deadlines) in the workload plan according to the dependencies in the workload plan. The workload deadlines are determined by moving (in an oriented graph defined by the work units and the dependencies of the work units) along any path from the impacted work unit until a corresponding workload deadline is reached. The predictor at block 475 calculates a float time for each of these workload deadlines. The float time is calculated as the time that remains for reaching the workload deadline from the current time, reduced by an execution time required to execute the work units in the corresponding path. In turn, the execution e of the work units is calculated by summing the expected durations of the work units (as indicated in the workload database). Therefore, the float time represents the time that may be lost in the path without affecting the workload plan (since the workload deadline of the workload plan would be met in any case). When the expected impact indicates that the impacting system event prevents the execution of the impacted work unit (for example, because of an error), the workload deadline is always taken into account. Conversely, when the expected impact indicates that the impacting system event simple delays the execution of the impacted work unit (for example, because of a warning), the workload deadline is taken into account only if the amount of the delay reaches the float time (since otherwise the amount of the delay does not prevent meeting the workload deadline). Moreover, the predictor at block 478 calculates a minimum time for each of the same workload deadlines. For this purpose, the execution time is calculated as above for the work units in any other paths leading to the workload deadline (independently of the impacted work unit) from a corresponding first work unit that is still pending (i.e., the first work unit is in execution or is waiting to be executed). The minimum time is then set to the highest of these execution times. Therefore, the minimum time represents the time that is necessary in any case for fulfilling the workload deadline. Continuing to block 481, the predictor determines the intervention time for the impacting system event. For this purpose, a candidate intervention time is determined for each of the same workload deadlines. If the float time plus the execution time of the corresponding path (i.e., the time remaining for reaching the workload deadline from the current time) is lower than the minimum time, the candidate intervention time is set to the float time (representing the time that is available to solve the impacting system event without missing the workload deadline). Conversely (meaning that another problem in the path of the minimum time already causes the missing of the workload deadline, so that it is useless to solve the another problem within the float time), the candidate intervention time is set to the minimum time minus the execution time of the path of the float time (representing the time that is available to solve the impacting system event without worsening the missing of the workload deadline). The intervention time is then set to the lowest of these potential intervention times. The predictor at block 484 then verifies whether a last expected impact of the impacting system event has been processed. If not, the flow of activity returns to the block 469 to repeat the same operations for a next expected impact.

Conversely, once all the expected impacts of the impacting system event have been processed, the loop is exit by descending into block 487. At this point, the predictor updates the expected problem table accordingly. Particularly, a corresponding expected problem is added (if necessary). The expected problem indicates the impacting system event, the (pending) impacted work units, the expected impacts from the impacted work units, the workload deadlines of the impacted work units, the confidence indexes of the expected impacts (from the expected impact repository), the severity indexes of the workload deadlines (for example, retrieved from the workload plan) and their intervention times. The same point is also reached from block 490 as soon as the predictor becomes aware (as above) that any impacting system event has been solved. In this case, the predictor removes the expected problem relating to this impacting system event from the expected problem table. Moreover, the same point is reached from the block 460 if none of the impacted work units of the impacting system event is pending (i.e., the impacted work unit has already been completed or is not comprised in the workload plan). In this case, the impacted system event has no immediate impact on the workload plan but is likely to have an immediate impact for a next version thereof. Therefore, the predictor adds a corresponding (low priority) expected problem to the expected problem table. The expected problem indicates the impacting system event, all the impacting system event's impacted work units and expected impacts, a null value for the workload deadlines of the impacted work units, the confidence indexes of the expected impacts, a null value of the severity indexes and a null value for the intervention times.

The flow of activity then continues from the block 487 to block 493. At this point, the planner generates a new version of the intervention program according to the (updated) problem table. For example, it is possible to assign a priority to each expected problem by weighting the shortest intervention time (the lower the intervention time the higher its contribution), the corresponding confidence index (the higher the confidence index the higher its contribution) and the corresponding severity index (the higher the severity index the higher its contribution). The expected problems are then ordered according to the priorities of the expected problems. Continuing to block 496, the planner passes the intervention program so obtained to the output driver, for example, for the display of the intervention program (in any case, with the possibility of ordering the expected problems at will according to any other criteria). For example, the intervention program may indicate that the system event SE1 has occurred, which is likely to cause the failure of the work unit WU1a and then missing the medium severity deadline WD1a with a confidence index of 90% if the failure is not solved within 1 h, and later on is likely to cause the delay of the work unit WU1b and then missing the low severity deadline WD1b with a confidence index of 50% if the failure is not solved within 2 h. Moreover, the intervention program may indicate that the system event SE2 as well has occurred, which is likely to cause the failure of the work unit WU2 and then missing the high severity deadline WD2 with a confidence index of 80% if the failure is not solved within 6 h. Therefore, the system administrator may decide to address the system event SE1 before since the system event SE1 is more urgent (even if the system event SE2 is more severe). The flow of activity then returns to the block 451 waiting for the occurrence of a next system event. The same point is also reached directly from the block 457 if the system event is not an impacting system event (so that the system event is likely to have no impact at all on any work unit and then may be disregarded or addressed independently).

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a computing system. However, the computing system may be of any type (see below).

In an embodiment, the computing system is configured for executing one or more work units according to a workload plan under the control of a workload scheduler. However, the work units may be in any number and of any type (for example, jobs, scripts, job streams); the execution of the work units may be controlled according to any workload plan (for example, changing every production period or repeated the same continually), under the control of any workload scheduler (for example, implemented by a classical software product or provided as a cloud service).

In an embodiment, the method comprises retrieving system event historical information. However, this information may be retrieved in any way (for example, in push or pull mode).

In an embodiment, the system event historical information is indicative of previous occurrences in the computing system of one or more system events. However, the system events may be in any number, occurred at any time (for example, always or only in a last period) and of any type (for example, errors, warnings, maintenance operations, user operations or any combination thereof), relating in any way to any execution environment of the work units (for example, their execution servers, accessed remote servers, exploited services).

In an embodiment, the method comprises retrieving work unit historical information. However, this information may be retrieved in any way (for example, after every production period or in real-time).

In an embodiment, the work unit historical information is indicative of previous executions of the work units. However, the previous executions may be in any number, occurred at any time (for example, always or only in a last period) and the corresponding information may be of any type (for example, indicating whether each execution is completed/failed, with or without any delay thereof).

In an embodiment, the method comprises estimating one or more expected impacts of one or more impacting system events of the system events on the execution of one or more impacted work units of the work units. However, the expected impacts may be in any number and of any type (for example, failures, delays of any length, such as classified in predefined ranges).

In an embodiment, the expected impacts are estimated according to the system event historical information and the work unit historical information. However, the expected impacts may be estimated in any way (for example, by applying more sophisticated statistic inference techniques).

In an embodiment, the method comprises predicting one or more expected problems in the workload plan. However, the expected problems may be in any number and of any type (for example, missing deadlines, delays over a threshold, quality degradations).

In an embodiment, the expected problems are predicted in response to any current occurrences of the impacting system events. However, the current occurrences of the impacting system events may be detected in any way (for example, in push or pull mode, periodically or in real-time).

In an embodiment, the expected problems are predicted according to the corresponding expected impacts and the workload plan. However, the expected problems may be predicted in any way (for example, individually or combining the expected impacts, comprising the corresponding interventions times, severity indexes, confidence indexes or different, alter alternative or additional information, such as feedback indexes of their actual occurrences).

In an embodiment, the method comprises establishing an intervention program of one or more system interventions on the computing system addressing the current occurrences of the impacting system events according to the corresponding expected problems. However, the intervention program may be established in any way (for example, for all the impacting system events, for the ones impacting the current version of the workload plan only); moreover, the system interventions may be in any number and of any type (for example, indicating the corresponding system events, their impacted work units, interventions times, severity indexes, confidence indexes or different, alternative or additional information, such as suggested solutions) and they may be arranged in any way (for example, ordered according to the intervention times, the severity indexes, the confidence indexes alone or in any combination). More generally, the intervention program may be any representation of the expected problems (down to a simple indication of each excepted problem or each corresponding impacting system event).

In an embodiment, the method comprises outputting an indication of the intervention program for programming the system interventions accordingly. However, the intervention program may be output on any device (either locally or remotely) and in any way (for example, displayed, printed); moreover, the intervention program may be used in any way for programming the system interventions for example, manually or automatically).

In an embodiment, said step of predicting one or more expected problems comprises predicting the expected problems to comprise corresponding intervention times available for addressing the expected problems before a manifestation thereof in the workload plan. However, the intervention times may be predicted in any way (for example, by adding a safety margin) to prevent any manifestation of the expected problems (for example, before missing a deadline, reaching a maximum allowable delay, exceeding a maximum allowable quality degradation).

In an embodiment, said step of predicting one or more expected problems comprises identifying workload deadlines relating to the impacted work units in the workload plan. However, the workload deadlines may be in any number (from the first one only to all of them) and of any type (for example, for completion of work units, starting of work units, individually or in combination).

In an embodiment, said step of predicting one or more expected problems comprises estimating the intervention times for addressing the expected problems before missing the corresponding workload deadlines. However, the intervention times may be estimated in any way (for example, according to the corresponding float times, with or without the corresponding minimum times).

In an embodiment, said step of estimating the intervention times comprises estimating each of the intervention times according to corresponding expected durations of one or more of the work units comprised in a path of the workload plan between the corresponding impacted work unit and the corresponding workload deadline. However, the expected durations may be determined in any way (for example, statically or dynamically, adapting them to current operative conditions, estimating an actual progress of the work units that are in execution).

In an embodiment, said step of predicting one or more expected problems comprises determining corresponding minimum times required to fulfill the workload deadlines according to a progress of the workload plan. However, the minimum time of each workload deadline may be determined in any way (for example, according to any expected durations of the corresponding work units as above, subtracting a safety margin).

In an embodiment, said step of predicting one or more expected problems comprises estimating each of the intervention times further according to the minimum time of the corresponding workload deadline. However, the minimum times may be used in any way (for example, to update the interventions times, simply as a warning) or they may be omitted at all.

In an embodiment, the method comprises repeating said step of predicting one or more expected problems, said step of establishing an intervention program and said step of outputting an indication of the intervention program for each of the impacting system events being unsolved in response to each new version of the workload plan. However, these operations may be repeated at any time (for example, after ending a previous version of the workload plan, before starting the new version of the workload plan), down to never (when the system events are processed only when they occur).

In an embodiment, said step of establishing an intervention program comprises prioritizing the system interventions according to the intervention times of the corresponding expected problems. However, the system interventions may be prioritized in any way according to the interventions times (for example, ordering them accordingly or simply highlighting the most urgent ones when the system interventions are ordered according to different criteria).

In an embodiment, said step of retrieving system event historical information comprises retrieving the system event historical information indicative of previous occurrences in the computing system of one or more errors and/or warnings. However, the errors may be of any type (for example, hardware, software, permanent, transient or any combination thereof) and/or the warnings may be of any type (for example, relating to any software and/or hardware resource, workload, performance or any combination thereof).

In an embodiment, said predicting one or more expected problems comprises predicting the expected problems to comprise corresponding severity indexes quantifying a severity of the expected problems. However, the severity indexes may be of any type (for example, numerical values, predefined ranges), determined in any way (for example, statically or dynamically according to feedback information), or they may be omitted at all.

In an embodiment, the method comprises estimating the expected impacts to comprise corresponding confidence indexes, which quantify a confidence of manifestation of the expected impacts in response to each of the current occurrences of the corresponding impacting system events. However, the confidence indexes may be of any type (for example, numerical values, ranges such as sometimes, often, always), determined in any way (for example, by assigning lower weights to older occurrences of the expected impacts in conjunction with the system events).

In an embodiment, the method comprises predicting the expected problems to comprise the confidence indexes of the corresponding expected impacts. However, the confidence indexes may be used in any way (for example, only to correlate the system events and the expected impacts, to prioritize the system interventions); however, a basic implementation without the confidence indexes is not excluded.

In an embodiment, the method comprises logging the system event historical information by a monitoring application in response to each of the current occurrences thereof. However, the system events may be logged at any time (for example, by collecting them periodically or in real-time), by any monitoring application (for example, with a centrally or distributed architecture, operating in conjunction with operating systems and/or any other software programs) or by any other software program external to the workload scheduler.

In an embodiment, the method comprises logging the work unit historical information by the workload scheduler in response to each end of the workload plan. However, the work unit historical information may be logged at any time (for example, periodically or in real-time).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the computer program may be implemented as a stand-alone module, as a plug-in for a pre-existing computer program (for example, the workload scheduler), or even directly in the latter; moreover, the computer program may run on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each of the steps of the above-mentioned method. An embodiment provides a system comprising a circuitry (i.e., any hardware suitably configured, for example, by software) configured for performing each of the steps of the same method. However, the system may be of any type (for example, any physical and/or virtual computing machine, either stand-alone or communicating with other computing machines via any local, wide area, global, cellular or satellite network and exploiting any type of wired and/or wireless connections).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which cute on the computer, other programmable apparatus, or other device implement the functions/acts specified in the flowchart and/ or block diagram block or blocks.

The flowchart and block diagrams in the Figures illustrate the architecture, functionality, and operation of possible implementations of systems, methods, and computer program products according to various embodiments of the present invention in this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:

estimating, by one or more processors, one or more expected impacts of one or more impacting system events of one or more system events on execution of one or more impacted work units of one or more work units according to (i) system event historical information indicative of previous occurrences in a computing system of the one or more system events and (ii) work unit historical information indicative of previous executions of the one or more work units;

predicting, by the one or more processors, one or more expected problems in a workload plan in response to any current occurrences of the impacting system events according to the corresponding expected impacts and the workload plan, wherein said predicting one or more expected problems comprises:

identifying workload deadlines relating to the impacted work units in the workload plan;

estimating intervention times for addressing the expected problems before missing the corresponding workload deadlines;

determining corresponding minimum times required to fulfill the workload deadlines according to a progress of the workload plan; and estimating each of the intervention times further according to the minimum time of the corresponding workload deadline;

establishing, by the one or more processors, an intervention program of one or more system interventions on the computing system, said system interventions addressing the current occurrences of the impacting system events according to the corresponding expected problems; and outputting, by the one or more processors, an indication of the intervention program for programming the system interventions accordingly.

2. The method of claim 1, wherein said predicting one or more expected problems comprises:

predicting the expected problems to comprise corresponding intervention times available for addressing the expected problems before a manifestation of the expected problems in the workload plan.

3. The method of claim 2, wherein the method comprises:

repeating said predicting one or more expected problems, said establishing an intervention program and said outputting an indication of the intervention program for each of the impacting system events being unsolved in response to each new version of the workload plan.

4. The method of claim 2, wherein said establishing the intervention program comprises:

prioritizing the system interventions according to the intervention times of the corresponding expected problems.

5. The method of claim 1, wherein said estimating the intervention times comprises:

estimating each of the intervention times according to corresponding expected durations of one or more of the work units comprised in a path of the workload plan between the corresponding impacted work unit and the corresponding workload deadline.

6. The method of claim 1, wherein said retrieving system event historical information comprises:

retrieving the system event historical information indicative of previous occurrences in the computing system of one or more errors and/or warnings.

7. The method of claim 1, wherein said predicting one or more expected problems comprises:

predicting the expected problems to comprise corresponding severity indexes quantifying a severity of the expected problems.

8. The method of claim 1, wherein the method comprises:

estimating, by the one or more processors, the expected impacts to comprise corresponding confidence indexes quantifying a confidence of manifestation of the expected impacts in response to each of the current occurrences of the corresponding impacting system events; and predicting, by the one or more processors, the expected problems to comprise the confidence indexes of the corresponding expected impacts.

9. The method of claim 1, wherein the method comprises:

logging the system event historical information by a monitoring application in response to each of the current occurrences of the impacting system events.

10. The method of claim 1, wherein the method comprises:

logging, by the one or more processors, the work unit historical information by the workload scheduler in response to each end of the workload plan.

11. A computer program product, the computer program product comprising one or more computer readable hardware storage devices having program instructions stored therein, said program instructions being executable by one or more processors of a computer system to perform a method, said method comprising:

estimating, by the one or more processors, one or more expected impacts of one or more impacting system events of one or more system events on execution of one or more impacted work units of one or more work units according to (i) system event historical information indicative of previous occurrences in a computing system of the one or more system events and (ii) work unit historical information indicative of previous executions of the one or more work units;

predicting, by the one or more processors, one or more expected problems in a workload plan in response to any current occurrences of the impacting system events according to the corresponding expected impacts and the workload plan, wherein said predicting one or more expected problems comprises:

identifying workload deadlines relating to the impacted work units in the workload plan;

estimating intervention times for addressing the expected problems before missing the corresponding workload deadlines;

determining corresponding minimum times required to fulfill the workload deadlines according to a progress of the workload plan; and estimating each of the intervention times further according to the minimum time of the corresponding workload deadline;

establishing, by the one or more processors, an intervention program of one or more system interventions on the computing system, said system interventions addressing the current occurrences of the impacting system events according to the corresponding expected problems; and outputting, by the one or more processors, an indication of the intervention program for programming the system interventions accordingly.

12. The computer program product of claim 11, wherein said predicting one or more expected problems comprises:

predicting the expected problems to comprise corresponding intervention times available for addressing the expected problems before a manifestation of the expected problems in the workload plan.

13. The computer program product of claim 12, wherein the method comprises:

repeating said predicting one or more expected problems, said establishing an intervention program and said outputting an indication of the intervention program for each of the impacting system events being unsolved in response to each new version of the workload plan.

14. The computer program product of claim 12, wherein said establishing the intervention program comprises:

prioritizing the system interventions according to the intervention times of the corresponding expected problems.

15. The computer program product of claim 11, wherein said estimating the intervention times comprises:

estimating each of the intervention times according to corresponding expected durations of one or more of the work units comprised in a path of the workload plan between the corresponding impacted work unit and the corresponding workload deadline.

16. A system, comprising one or more processors, one or more memories, and one or more computer readable hardware storage devices, said one or more hardware storage device containing program instructions executable by the one or more processors via the one or more memories to implement a method, said method comprising:

estimating, by the one or more processors, one or more expected impacts of one or more impacting system events of one or more system events on execution of one or more impacted work units of one or more work units according to (i) system event historical information indicative of previous occurrences in a computing system of the one or more system events and (ii) work unit historical information indicative of previous executions of the one or more work units;

predicting, by the one or more processors, one or more expected problems in a workload plan in response to any current occurrences of the impacting system events according to the corresponding expected impacts and the workload plan, wherein said predicting one or more expected problems comprises:

identifying workload deadlines relating to the impacted work units in the workload plan;

estimating intervention times for addressing the expected problems before missing the corresponding workload deadlines;

determining corresponding minimum times required to fulfill the workload deadlines according to a progress of the workload plan; and estimating each of the intervention times further according to the minimum time of the corresponding workload deadline;

establishing, by the one or more processors, an intervention program of one or more system interventions on the computing system, said system interventions addressing the current occurrences of the impacting system events according to the corresponding expected problems; and outputting, by the one or more processors, an indication of the intervention program for programming the system interventions accordingly.

17. The system of claim 16, wherein said predicting one or more expected problems comprises:

predicting the expected problems to comprise corresponding intervention times available for addressing the expected problems before a manifestation of the expected problems in the workload plan.

18. The system of claim 17, wherein the method comprises:

repeating said predicting one or more expected problems, said establishing an intervention program and said outputting an indication of the intervention program for each of the impacting system events being unsolved in response to each new version of the workload plan.

19. The system of claim 17, wherein said establishing the intervention program comprises:

prioritizing the system interventions according to intervention times of the corresponding expected problems.

20. The system of claim 16, wherein said estimating the intervention times comprises:

estimating each of the intervention times according to corresponding expected durations of one or more of the work units comprised in a path of the workload plan between the corresponding impacted work unit and the corresponding workload deadline.

* * * * *